United States Patent
Lee et al.

(10) Patent No.: US 8,914,472 B1
(45) Date of Patent: Dec. 16, 2014

(54) EXPERIENCE SHARING FOR TRAINING

(75) Inventors: Steven John Lee, San Francisco, CA (US); Indika Charles Mendis, Mountain View, CA (US); Max Benjamin Braun, San Francisco, CA (US)

(73) Assignee: Google Inc., Mountain View, CA (US)

( * ) Notice: Subject to any disclaimer, the term of this patent is extended or adjusted under 35 U.S.C. 154(b) by 100 days.

(21) Appl. No.: 13/439,645

(22) Filed: Apr. 4, 2012

Related U.S. Application Data

(60) Provisional application No. 61/510,020, filed on Jul. 20, 2011.

(51) Int. Cl.
*G06F 15/16* (2006.01)

(52) U.S. Cl.
USPC .......................................... 709/219; 709/205

(58) Field of Classification Search
None
See application file for complete search history.

(56) References Cited

U.S. PATENT DOCUMENTS

| | | | |
|---|---|---|---|
| 6,611,242 B1 | 8/2003 | Hongo | |
| 6,711,414 B1 | 3/2004 | Lightman | |
| 7,255,437 B2 | 8/2007 | Howell et al. | |
| 7,401,918 B2 | 7/2008 | Howell et al. | |
| 7,481,531 B2 | 1/2009 | Howell et al. | |
| 7,532,224 B2 * | 5/2009 | Bannai | 345/633 |
| 7,543,934 B2 | 6/2009 | Howell et al. | |
| 7,546,352 B1 | 6/2009 | Bhattiprolu et al. | |
| 7,683,937 B1 | 3/2010 | Blumenfeld | |
| 7,771,046 B2 | 8/2010 | Howell et al. | |
| 7,780,450 B2 | 8/2010 | Tarry | |
| 7,792,552 B2 | 9/2010 | Thomas et al. | |
| 7,806,525 B2 | 10/2010 | Howell et al. | |
| 8,094,090 B2 | 1/2012 | Fisher | |
| 2002/0049510 A1 * | 4/2002 | Oda et al. | 700/114 |
| 2004/0152058 A1 * | 8/2004 | Browne et al. | 434/258 |
| 2005/0138560 A1 | 6/2005 | Lee et al. | |
| 2006/0170652 A1 * | 8/2006 | Bannai et al. | 345/156 |
| 2008/0103877 A1 | 5/2008 | Gerken | |
| 2008/0270541 A1 | 10/2008 | Keener et al. | |
| 2009/0013263 A1 | 1/2009 | Fortnow et al. | |
| 2009/0102746 A1 * | 4/2009 | Fisher et al. | 345/8 |
| 2009/0157816 A1 | 6/2009 | Pattan | |
| 2009/0187389 A1 * | 7/2009 | Dobbins et al. | 703/6 |
| 2009/0215477 A1 | 8/2009 | Lee et al. | |
| 2009/0219166 A1 | 9/2009 | MacFarlane et al. | |
| 2010/0082759 A1 | 4/2010 | Nalliah et al. | |
| 2010/0125531 A1 | 5/2010 | Wong | |
| 2011/0035453 A1 | 2/2011 | Koul et al. | |
| 2011/0055046 A1 | 3/2011 | Bowen et al. | |
| 2011/0096168 A1 | 4/2011 | Siann et al. | |
| 2011/0128364 A1 * | 6/2011 | Ono | 348/78 |

(Continued)

*Primary Examiner* — Jason K. Gee
*Assistant Examiner* — Maung Lwin
(74) *Attorney, Agent, or Firm* — McDonnell Boehnen Hulbert & Berghoff LLP

(57) ABSTRACT

Some disclosed examples relate to facilitating an experience-sharing session in real-time between a first head-mountable display (HMD) and a second HMD. The experience-sharing session can include a demonstration phase and an observation phase. During the demonstration phase, a server system can receive first media content from the first HMD and send the first media content in real-time to the second HMD. The first media content can include a point-of-view video recorded at the first HMD. During the observation phase, the server system can receive second media content from the second HMD and send the second media content in real-time to the first HMD. The second media content can include a point-of-view video recorded at the second HMD.

19 Claims, 10 Drawing Sheets

(56) References Cited

U.S. PATENT DOCUMENTS

| | | |
|---|---|---|
| 2011/0221657 A1 | 9/2011 | Haddick et al. |
| 2011/0246421 A1 | 10/2011 | Takahashi |
| 2012/0056972 A1 | 3/2012 | Benedeki et al. |
| 2012/0166453 A1 | 6/2012 | Broder |
| 2012/0182384 A1 | 7/2012 | Anderson et al. |
| 2012/0320013 A1* | 12/2012 | Perez et al. .......... 345/207 |

* cited by examiner

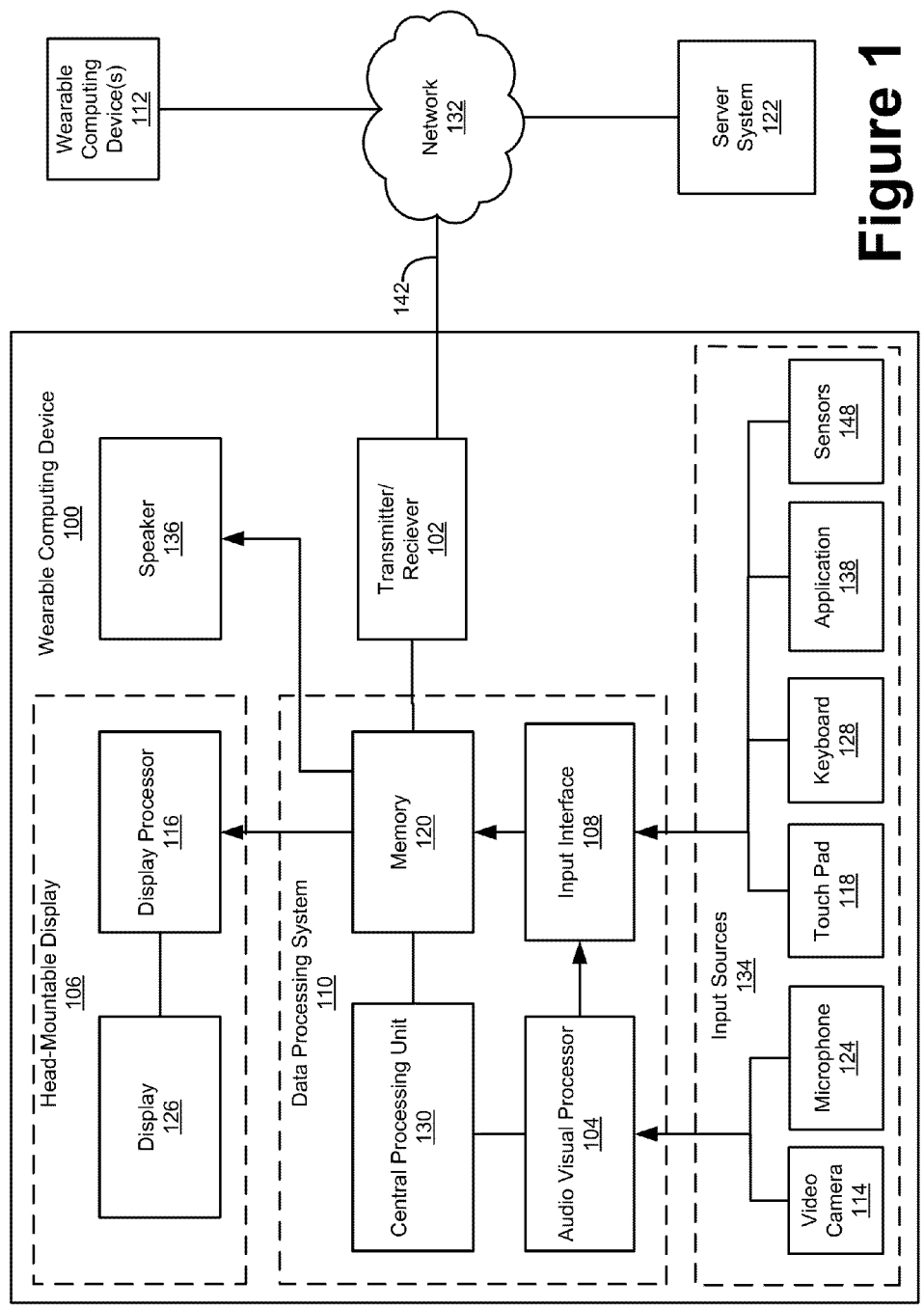

EXPERIENCE SHARING FOR TRAINING

CROSS REFERENCE TO RELATED APPLICATIONS

This application claims priority to U.S. Patent Application No. 61/510,020, filed Jul. 20, 2011, entitled "Experience Sharing", the contents of which are incorporated by reference herein for all purposes.

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a very small image display element close enough to a wearer's eye(s) such that the displayed image fills or nearly fills the field of view, and appears as a normal sized image, such as might be displayed on a traditional image display device. The relevant technology may be referred to as "near-eye displays."

Near-eye displays are fundamental components of wearable displays, also sometimes called head-mountable displays (HMDs). A HMD places a graphic display or displays close to one or both eyes of a wearer. To generate the images on a display, a computer processing system can be used. Such displays can occupy a wearer's entire field of view, or only occupy part of the wearer's field of view. Further, HMDs can be as small as a pair of glasses or as large as a helmet.

SUMMARY

In some implementations, a first computer-implemented method comprises a server system facilitating an experience-sharing session in real-time between a first head-mountable display (HMD) and a second HMD. The experience-sharing session includes a demonstration phase and an observation phase. During the demonstration phase, the server system receives first media content from the first HMD and sends the first media content in real-time to the second HMD. The first media content includes a point-of-view video recorded at the first HMD. During the observation phase, the server system receives second media content from the second HMD and sends the second media content in real-time to the first HMD. The second media content includes a point-of-view video recorded at the second HMD.

In some implementations, a system comprises a non-transitory computer-readable medium and program instructions. The program instructions are stored on the medium and executable by at least one processor to perform a method, such as the first computer-implemented method.

In some implementations, a second computer-implemented method comprises a first wearable device initiating in an experience-sharing session in real-time with a second wearable device. The experience-sharing session including a first phase and a second phase. During the first phase, the first wearable device generates first media content and sends the first media content in real-time to the second wearable device. The first media content includes a point-of-view video recorded at the first wearable device. During the second phase, the first wearable device receives second media content and displays the second media content in real-time. The second media content includes a point-of-view video recorded at the second wearable device.

In some implementations, a wearable-device system comprises a non-transitory computer-readable medium and program instructions. The program instructions are stored on the medium and executable by at least one processor to perform a method, such as the second computer-implemented method.

BRIEF DESCRIPTION OF THE FIGURES

FIG. 1 illustrates an example of a system in which a sharing device can operate.

DETAILED DESCRIPTION

General Overview of Experience Sharing

Figure 2A:
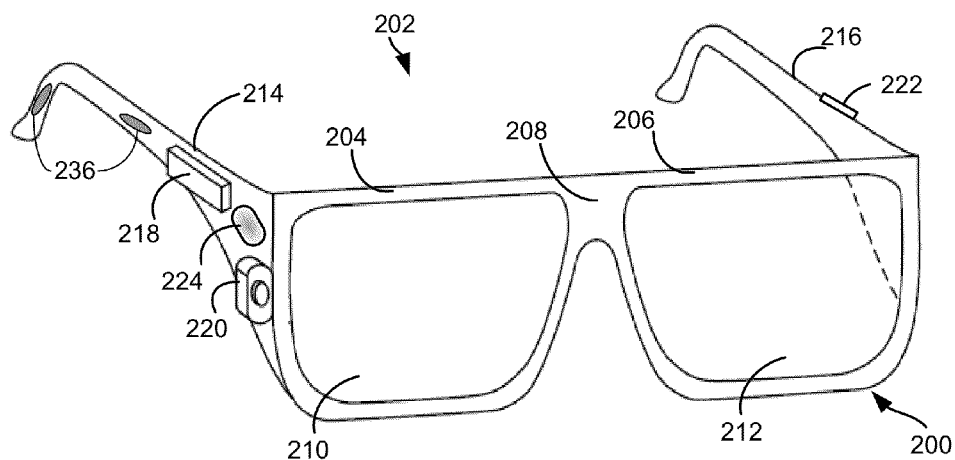
FIGS. 2A and 2B illustrate an example of a wearable computing device.

Experience sharing generally involves a user sharing media that captures the user's experience with one or more other users. As an example, a user can use a wearable computing device or another sharing device to capture media that conveys the world as the user experiences it, and then transmit the media to others in order to share the user's experience. For instance, in an experience-sharing session, a user can share a point-of-view video feed captured by a video camera on a head-mountable display (HMD) of the user's wearable computing device, along with a real-time audio feed from a microphone of the wearable computing device. These examples are merely illustrative, and other examples are possible as well.

In an experience-sharing session, a computing device that is sharing a user's experience may be referred to as a "sharing device", while a computing device that is receiving real-time media from the sharing device may be referred to as a "viewing device". In addition, content that is shared by the sharing device during an experience-sharing session may be referred to as a "share." Further, a computing system that supports an experience-sharing session between a sharing device and one or more viewing devices may be referred to as a "server system."

A sharing device can transmit a share in real-time to a viewing device, allowing an experience to be portrayed as it occurs. The sharing device can also receive and present comments from the viewing device. For example, a sharing device can share an experience of navigating a hedge maze while receiving help or criticism from a viewing device. In addition, a server system can store a share so that new or original viewing devices can access the share outside of real-time.

A share can include a single type of media content (or, put differently, a single modality of media) or multiple types of media content (or, put differently, multiple modalities of media). In either case, a share can include a video. The video can be a three-dimensional (3D) video. For example, the video can be a video created by two cameras and combined in 3D form. The share can also, or instead, include an audio feed, a text-based feed, an application-generated feed, or combinations of these and other types of media content.

In addition, a share can include multiple instances of the same type of media content. For example, a share can include two or more videos. For instance, the share can include a first video from a forward-facing camera on a HMD, and a second video feed from a camera on the HMD that is facing inward towards the wearer's face. As another example, a share can include multiple audio feeds to generate stereo audio or spatially-localized audio providing surround sound.

A server system can allow a user of a viewing device in an experience-sharing session to participate in a voice chat in association with the experience-sharing session. For example, a server system can support a voice chat feature that allows viewing devices in an experience-sharing session to enter an associated voice-chat session. The viewing devices can be provided with a real-time audio connection with one another so that each of the viewing devices can play audio from all the other devices in the session. As another example, the server system supporting the voice-chat session can sum or mix audio from all participating viewing devices into a combined audio feed that is output to all the participating devices. In this example, signal processing can be used to minimize noise when audio is not received from a participating device (for example, when a user of a device is not speaking). In addition, when a participant exits the chat room, the participant's audio connection can be disabled. Note, however, that the participant can still participate in the associated experience-sharing session. This configuration can help to create a perception of an open audio communication channel.

The server can also support a video-chat feature that is associated with an experience-sharing session. For example, some or all of the participants in a video chat can stream a low-resolution video feed. The participants can be provided with a view of a number of the low-resolution video feeds on the same screen as the video from a sharing device, along with a combined audio feed as disclosed above. For instance, low-resolution video feeds from viewing devices or the sharing device can be displayed to a participating viewing device. Alternatively, the server system can determine when a given participating device is transmitting speech from its user, and update which video is displayed based on which participant is transmitting speech at a given time.

Video feeds of a given viewing device can be formatted to capture the user so that the user can be seen as he or she speaks. Further, the video from a given viewing device or the sharing device can be processed to include a text caption. The text caption can include, for example, a name of a given device's user or a location of a device. These examples are merely illustrative, and other processing can also be applied to video feeds in a video chat session.

A video chat session can rotate the role of sharer between different participating devices (with those devices that are not designated as the sharing device at a given time acting as a viewing device.) For example, when a number of wearable computing devices are involved in a rotating-sharer experience-sharing session, the supporting server system can analyze audio feeds from the participating wearable computing device to determine which wearable computing device is transmitting audio including the associated user's speech. Accordingly, the server system can select the video from the wearable computing device and transmit the video to the other participating wearable computing devices. The wearable computing devices can be de-selected when the server system determines that speech is no longer being received from that wearable computing device. Alternatively, the wearable computing device can be de-selected after waiting a predetermined amount of time after the wearable computing device ceases transmission of speech.

The video from some or all of the wearable computing devices that participate in a video chat session can capture an experience of the user that is wearing the wearable computing device. Therefore, when a given wearable computing device is selected, the wearable computing device can function as the sharing device in the experience-sharing session, and other wearable computing devices can function as viewing devices. Thus, as different wearable computing devices are selected, the role of the sharer in the experience-sharing session can be passed between or among the wearable computing devices. In this scenario, the sharer in the experience-sharing session can be updated so that the user who is speaking at a given time shares what the user is seeing with other users in the session.

In a variation of the above-described video-chat application, when multiple participants are acting as sharers and transmitting a share, individual viewers can select which share they receive so that different viewers can concurrently receive different shares.

In addition, the experience-sharing session can have a "directing viewer" that can select which shares or shares will be displayed at any given time. This arrangement can be useful when several viewing devices are transmitting a share related to a certain event. For example, several members of a football team can be equipped with a helmet-mounted camera. The members of the team can act as sharers in a multi-sharer experience-sharing session by transmitting a real-time video feed from their respective helmet-mounted cameras. A directing viewer can then select which video feed (or feeds) to display at a given time. For example, at a given time, the directing viewer can select a video feed from a member who is involved in a play that is currently occurring.

The server system can also be configured to resolve conflicts if multiple devices transmit speech from their users simultaneously. Alternatively, an interface of an experience-sharing session can be configured to display multiple video feeds at once (for example, to create multiple simultaneous sharers in the experience-sharing session). For example, if speech is received from multiple participating devices at once, a participating device can divide its display to show the video feeds from some or all of the devices from which speech is simultaneously received.

A device that participates in an experience-sharing session can store a share or portions of the share for future reference. For example, in a video-chat implementation, a participating device or a server system can store video or audio that is shared during an experience-sharing session. The participating device or server system can also store a transcript of audio from the session.

General Overview of Experience Sharing for Training

An experience-sharing session can be used for training. In an implementation, a server system can facilitate an experience-sharing session in real-time between a first head-mountable display (HMD) and a second HMD. During a demonstration phase of the session, an expert can use the first HMD to generate a video showing how to perform a task from the expert's perspective and/or provide instructions to the novice. The video can be transmitted to the second HMD in real-time. Accordingly, the novice can use the second HMD to see the task being performed from the expert's point-of-view.

During the observation phase of the session, the novice can re-enact the task and take other actions according to instruction from the expert. Further, during the observation phase, the second HMD generates a video showing the novice's point-of-view of the re-enactment. The video can be transmitted to the first HMD in real-time. Accordingly, the expert can use the first HMD to watch the video and to provide comments in real-time in an attempt to improve the novice's ability to perform the task.

Experience sharing can be useful in many training situations, especially those in which a person or group can benefit from experiencing an activity from an expert's point-of-view. For example, experience sharing can be useful to teach an athlete how to perform a sporting maneuver, such as hitting a baseball, kicking a soccer ball, or performing a golf-swing. As another example, experience sharing can be useful to teach a medical student how to perform a medical procedure, such as a surgery, a diagnostic examination, or a dissection. As yet another example, experience sharing can be useful to teach a novice mechanic how to repair a damaged vehicle panel, service a vehicle, or change a vehicle's oil. As still another example, experience sharing can be useful to teach a child how to perform household duties, such as cooking, doing laundry, or doing the dishes. As yet other examples, experience sharing can be useful for teaching sign language and facilitating physical therapy sessions. These examples are merely illustrative, and experience-sharing can be useful in a variety of other training situations.

Example of a System Architecture

FIG. 1 illustrates an example of a system in which a sharing device can operate. In particular, FIG. 1 shows a wearable computing device 100 that is configured to serve as a sharing device in an experience-sharing session. The wearable computing device 100 is one type of sharing device, and other computing devices can be configured to provide similar sharing-device functions and can include similar components as those described in reference to the wearable computing device 100.

The wearable computing device 100 includes a head-mountable display (HMD) 106, a data processing system 110, several input sources 134, and a transmitter/receiver 102. A communicative link 142 can be established between the wearable computing device 100 and a network 132. The network 132 can connect to one or more other wearable computing devices 112 and to a server system 122.

The input sources 134 can include a video camera 114, a microphone 124, a touch pad 118, a keyboard 128, an application 138, and sensors 148. The input sources 134 can be internal to the wearable computing device 100 (as shown in FIG. 1), or can be partially or entirely external to the wearable computing device 100. The input sources 134 that are shown in FIG. 1 are merely illustrative. In other implementations, any of the input sources 134 can be excluded or another input source not shown can be included.

The sensors 148 can include one or more location sensors. A location sensor can determine and provide a location of the wearable computing device 100 by utilizing suitable technologies. Example of suitable technologies include global positioning system (GPS), other satellite-based technologies, inertial navigation technologies, timing circuitry, accelerometers, compasses, velocity sensors, gyroscopes, and combinations of these and other technologies. For example, the location sensor can determine and provide the wearable computing device 100 with information such as a distance, a speed or velocity, an acceleration, and timing information. These examples are merely illustrative, and the location sensor can provide other suitable types of information.

The data processing system 110 can include a memory system 120, a central processing unit (CPU) 130, an input interface 108, and an audio visual (A/V) processor 104. The memory system 120 can be configured to receive data from the input sources 134, the transmitter/receiver 102, or both. The memory system 120 can also be configured to store received data and then distribute the received data to the CPU 130, to the HMD 106, or to a set of speakers 136. The memory system 120 can also be configured to distribute the received data to a remote device, such as the other wearable computing device(s) 112, through the transmitter/receiver 102. The CPU 130 can be configured to detect a stream of data in the memory system 120 and control how the memory system distributes the stream of data.

The input interface 108 can be configured to process a stream of data from the input sources 134 and then transmit the stream of data to the memory system 120. Processing a stream of data can include converting a raw signal, coming directly from the input sources 134 or A/V processor 104, into a stream of data that is usable by another element in the wearable computing device 100, the other wearable computing device(s) 112, or the server system 122. The A/V processor 104 can be configured to perform audio processing on audio feeds from the microphone 124 and video processing on video feeds from the video camera 114. The CPU 130 can be configured to control the audio and visual processing performed on the audio feeds and the video feeds.

The HMD 106 can be configured to display visual objects derived from many types of visual multimedia, including video, text, graphics, pictures, application interfaces, and animations. Notably, the set of speakers 136 can also present audio objects. The HMD 106 can include a display processor 116. The display processor 116 can be configured to store and transmit a visual object to a display 126, which can be configured to display the visual object. The display processor 116 can also edit the visual object for a variety of purposes. One purpose for editing a visual object can be to synchronize a display of the visual object by the display 126 with a presentation of an audio object by the set of speakers 136. Another purpose for editing a visual object can be to compress the visual object to reduce load on the display. Still another purpose for editing a visual object can be to correlate a display of the visual object with other visual objects currently displayed by the HMD 106.

While FIG. 1 illustrates the wearable computing device 100 as a sharing device, a sharing device can take other forms. For example, a sharing device can be a mobile phone, a tablet computer, a personal computer, or any other computing device configured to provide the disclosed sharing-device functionality.

In general, any disclosed computing device, such as the wearable computing device 100, can include or have access to memory or data storage, and can include a non-transitory computer-readable medium having stored program instructions. In addition, any disclosed computing device can include or have access to one or more processors. Program instructions stored on such a non-transitory computer-readable medium can be executable by at least one processor to carry out part or all of the disclosed functionality.

Examples of Wearable Computing Devices

FIG. 2A illustrates an example of a wearable computing device 200. While FIG. 2A illustrates a head-mountable display (HMD) 202 as an example of a wearable computing device, other types of wearable computing devices can additionally or alternatively be used. As illustrated in FIG. 2A, the HMD 202 includes frame elements. The frame elements include lens-frames 204, 206, a center frame support 208, lens elements 210, 212, and extending side-arms 214, 216. The center support frame 208 and the extending side-arms 214, 216 are configured to secure the HMD 202 to a user's face via a user's nose and ears.

Each of the frame elements 204, 206, 208 and the extending side-arms 214, 216 can be formed of a solid structure of plastic, metal, or both, or can be formed of a hollow structure of similar material to allow wiring and component interconnects to be internally routed through the HMD 202. Other materials can be used as well.

The lens elements 210, 212 can be formed of any material or combination of materials that can suitably display a projected image or graphic. The lens elements 210, 212 can also be sufficiently transparent to allow a user to see through the lens elements 210, 212. Combining these two features of the lens elements 210, 212 can facilitate an augmented reality or heads-up display, in which a projected image or graphic is superimposed over a real-world view as perceived by the user through the lens elements 210, 212.

The extending side-arms 214, 216 can be projections that extend away from the lens-frames 204, 206, respectively, and can be positioned behind a user's ears to secure the HMD 202 to the user. The extending side-arms 214, 216 can further secure the HMD 202 to the user by extending around a rear portion of the user's head. The HMD 202 can be affixed to a head-mounted helmet structure. Other possibilities exist as well.

The HMD 202 can include an on-board computing system 218, a video camera 220, a sensor 222, and a finger-operable touch pad 224. The on-board computing system 218 is shown to be positioned on the extending side-arm 214 of the HMD 202; however, the on-board computing system 218 can be provided on other parts of the HMD 202 or can be positioned remotely from the HMD 202. For example, the on-board computing system 218 can be connected by wire or wirelessly to the HMD 202. The on-board computing system 218 can include a processor and memory. The on-board computing system 218 can be configured to receive and analyze data from the video camera 220, from the finger-operable touch pad 224, and from other sensory devices and user interfaces. The on-board computing system 218 can be configured to generate images for output by the lens elements 210, 212.

The video camera 220 is shown positioned on the extending side-arm 214 of the HMD 202; however, the video camera 220 can be provided on other parts of the HMD 202. The video camera 220 can be configured to capture images at various resolutions or at different frame rates. Although FIG. 2A shows a single video camera 220, the HMD 202 can include several small form-factor video cameras, such as those used in cell phones or webcams.

Further, the video camera 220 can be configured to capture the same view or different views. For example, the video camera 220 can be forward-facing (as illustrated in FIG. 2A) to capture an image or video depicting a real-world view perceived by the user. The image or video can then be used to generate an augmented reality in which computer-generated images appear to interact with the real-world view perceived by the user. In addition, the HMD 202 can include an inward-facing camera. For example, the HMD 202 can include an inward-facing camera that can track the user's eye movements.

As mentioned above, the HMD 202 can include a sensor 222. The sensor 222 is shown on the extending side-arm 216 of the HMD 202; however, the sensor 222 can be positioned on other parts of the HMD 202. For example, the sensor 222 can include a location sensor, a gyroscope, an accelerometer, and combinations of these and other types of sensors. These examples are merely illustrative, and the sensor 222 can include any suitable sensing device and can perform any suitable sensing function.

The finger-operable touch pad 224 is shown on the extending side-arm 214 of the HMD 202. However, the finger-operable touch pad 224 can be positioned on other parts of the HMD 202. Also, more than one finger-operable touch pad can be present on the HMD 202. The finger-operable touch pad 224 can allow a user to input commands. The finger-operable touch pad 224 can sense a position or movement of a finger via capacitive sensing, resistance sensing, a surface acoustic wave process, or combinations of these and other techniques. The finger-operable touch pad 224 can be capable of sensing finger movement in a direction parallel or planar to a pad surface of the touch pad 224, in a direction normal to the pad surface, or both. The finger-operable touch pad can be capable of sensing a level of pressure applied to the pad surface. The finger-operable touch pad 224 can be formed of one or more translucent or transparent layers, which can be insulating or conducting layers. Edges of the finger-operable touch pad 224 can be formed to have a raised, indented, or roughened surface, to provide tactile feedback to a user when the user's finger reaches the edge of the finger-operable touch pad 224. If more than one finger-operable touch pad is present, each finger-operable touch pad can be operated independently, and can provide a different function.

Figure 2B:
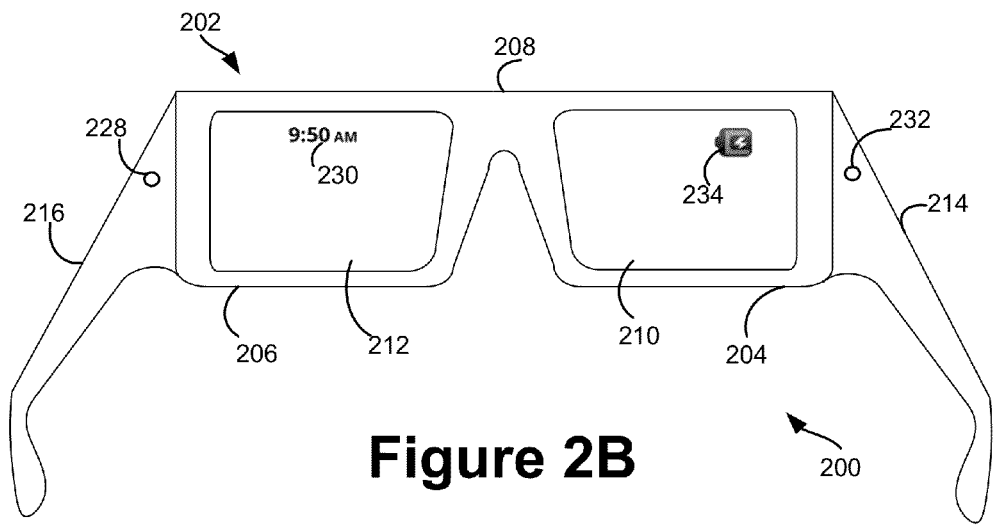

FIG. 2B illustrates an alternate view of the HMD 202 illustrated in FIG. 2A. As shown in FIG. 2B, the lens elements 210, 212 can function as display elements. The HMD 202 can include a first projector 228 coupled to an inside surface of the extending side-arm 216 and configured to project a display 230 onto an inside surface of the lens element 212. A second projector 232 can be coupled to an inside surface of the extending side-arm 214 and can be configured to project a display 234 onto an inside surface of the lens element 210.

The lens elements 210, 212 can function as a combiner in a light projection system and can include a coating that reflects the light projected onto them from the projectors 228, 232. In some implementations, a reflective coating may not be used, for example, when the projectors 228, 232 are scanning laser devices.

Other types of display elements can also be used. For example, the lens elements 210, 212 can include a transparent or semi-transparent matrix display, such as an electroluminescent display or a liquid crystal display. As another example, the HMD 202 can include waveguides for delivering an image to the user's eyes or to other optical elements capable of delivering an in focus near-to-eye image to the user. Further, a corresponding display driver can be disposed within the frame elements 204, 206 for driving such a matrix display. As yet another example, a laser or light emitting diode (LED) source and a scanning system can be used to draw a raster display directly onto the retina of one or more of the user's eyes. These examples are merely illustrative, and other display elements and techniques can be used as well.

Figure 2C:
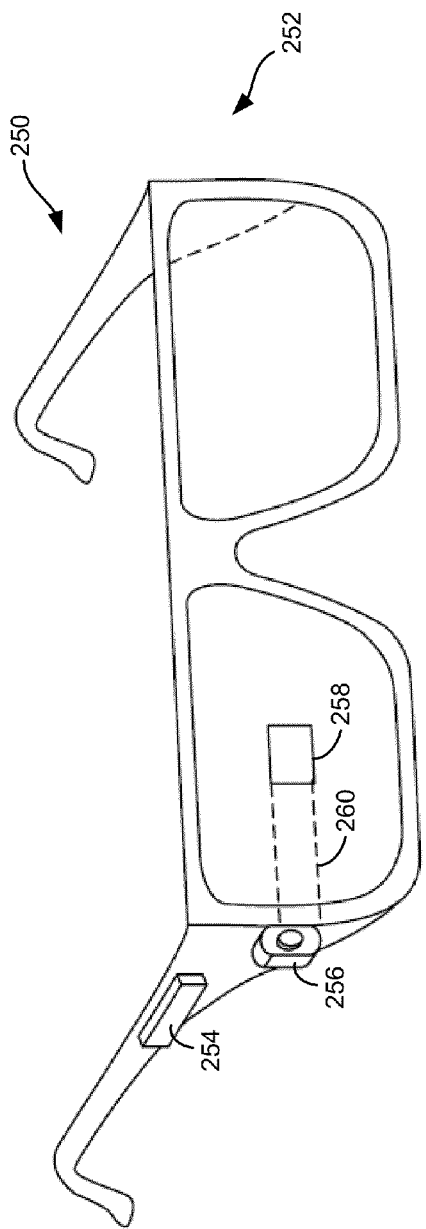
FIG. 2C illustrates another example of a wearable computing device.

FIG. 2C illustrates another example of a wearable computing device 250. While FIG. 2C illustrates a HMD 252 as an example of a wearable computing device, other types of wearable computing devices can additionally or alternatively be used. The HMD 252 can include frame elements and side-arms, such as those described above in connection with FIGS.

2A and 2B. The HMD 252 can include an on-board computing system 254 and a video camera 256, such as those described in connection with FIGS. 2A and 2B. The video camera 256 is shown mounted on a frame of the HMD 252; however, the video camera 256 can be mounted at other positions as well.

As shown in FIG. 2C, the HMD 252 can include a single display 258, which can be coupled to the HMD 252. The display 258 can be formed on one of the lens elements of the HMD 252, such as a lens element described in connection with FIGS. 2A and 2B. The display 258 can be configured to overlay computer-generated graphics in the user's view of the physical world. The display 258 is shown to be provided at a center of a lens of the HMD 252; however, the display 258 can be provided at other positions. The display 258 is controllable via the on-board computing system 254 that is coupled to the display 258 via an optical waveguide 260.

Figure 2D:
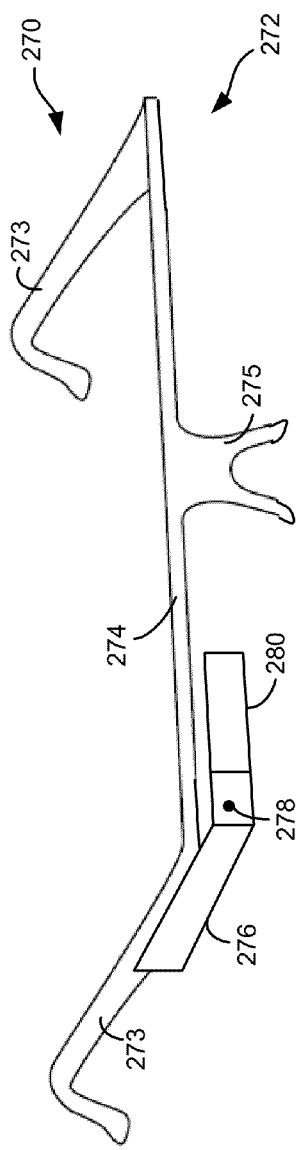
FIG. 2D illustrates another example of a wearable computing device.

FIG. 2D illustrates another example of a wearable computing device 270. While FIG. 2C illustrates a HMD 272 as an example of a wearable computing device, other types of wearable computing devices can be used. The HMD 272 can include side-arms 273, a center support frame 274, and a bridge portion with nosepiece 275. The center support frame 274 connects the side-arms 273. As shown in FIG. 2D, the HMD 272 does not include lens-frames containing lens elements. The HMD 272 can include an on-board computing system 276 and a video camera 278, such as those described in connection with FIGS. 2A and 2B.

The HMD 272 can include a single lens element 280, which can be coupled to one of the side-arms 273 or to the center support frame 274. The lens element 280 can include a display, such as the display described in connection with FIGS. 2A and 2B, and can be configured to overlay computer-generated graphics upon the user's view of the physical world. As an example, the lens element 280 can be coupled to the inner side (for example, the side exposed to a portion of a user's head when worn by the user) of the extending side-arm 273. The lens element 280 can be positioned in front of (or proximate to) a user's eye when the HMD 272 is worn by the user. For example, as shown in FIG. 2D, the lens element 280 can be positioned below the center support frame 274.

Some implementations of the HMDs 202 (shown in FIGS. 2A and 2B), 252 (shown in FIG. 2C), and 272 (shown in FIG. 2D) can include a set of audio devices, including one or more speakers or microphones, such as those discussed in the previous section and shown in FIG. 1. The set of audio devices can be integrated in the HMD 202, 252, 272 or can be externally connected to the HMD 202, 252, 272 through a wired or wireless connection.

Cloud-Based Experience Sharing

A remote server system can help reduce a sharing device's processing load. For example, a sharing device can transmit a share to a remote, cloud-based server system, which can function to distribute the share to appropriate viewing devices. As part of a cloud-based implementation, the sharing device can communicate with the server system through a wireless connection, through a wired connection, or through a network that includes a combination of wireless and wired connections. The server system can likewise communicate with the viewing devices through a wireless connection, through a wired connection, or through a network that includes a combination of wireless and wired connections. The server system can then receive, process, store, and transmit both the share from the sharing device and comments from viewing devices.

Figure 2E:
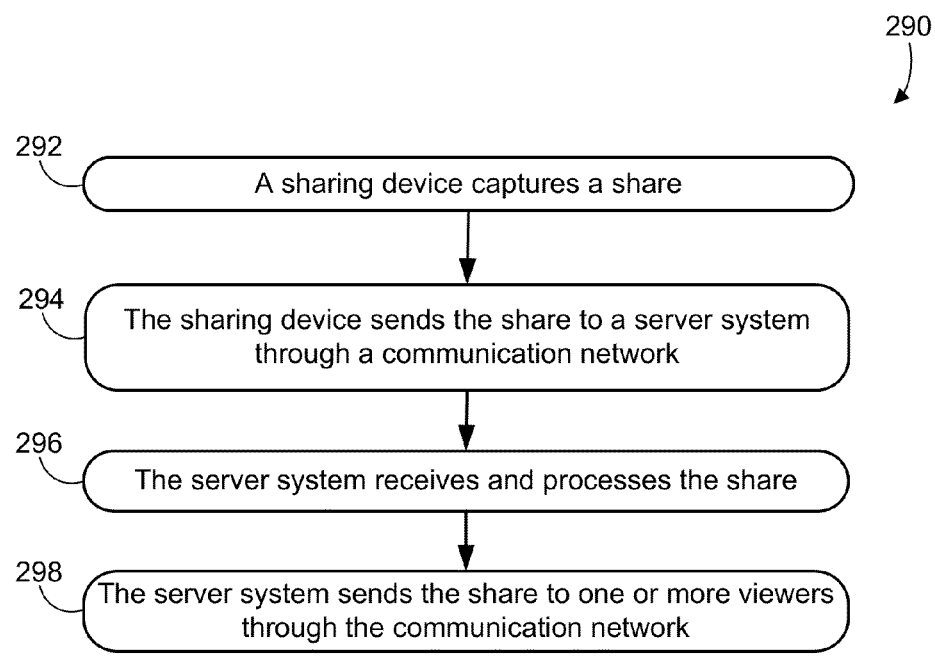
FIG. 2E illustrates an example of a cloud-based method of transmitting a share.

FIG. 2E illustrates an example of a cloud-based method 290 of transmitting a share. At block 292 of the method 290, a sharing device capturing a share. At block 294, the sharing device transmits the share to a server system through a communication network. At block 296, the server system receives and processes the share. At block 298, the server system transmits the share to at least one viewing device through the communication network.

A server system can process a share in various ways before transmitting the share to a given viewing device. In some implementations, a server system can format media components of a share to help adjust for a particular viewing device's needs or preferences. For example, consider a viewing device that is participating in an experience-sharing session via a website that uses a specific video format. In this example, when a share includes a video, the server system can format the video according to the specific video format used by the website before transmitting the video to the viewing device. As another example, if a viewing device is a personal digital assistant (PDA) that can only play audio feeds in a specific audio format, the server system can format an audio portion of a share according to the specific audio format before transmitting the audio portion to the viewing device. These examples are merely illustrative, and a server system can format a share to accommodate a given viewing devices in various other ways. In some implementations, a server system can format the same share in a different manner for different viewing devices in the same experience-sharing session.

A server system can compress a share or a portion of a share before transmitting the share or portion to a viewing device. For example, if a server system receives a high-resolution share, the server can compress the share before transmitting the share to the one or more viewing devices. In this example, if a connection between the server system and a certain viewer runs too slowly for real-time transmission of the high-resolution share, then the server system can temporally or spatially compress the share and transmit the compressed share to the viewing device. As another example, if a viewing device requires a slower frame rate for video feeds, a server system can temporally compress a share by removing extra frames before transmitting the share to the viewing device. As yet another example, a server system can be configured to save bandwidth by down sampling a video before transmitting the video to a viewing device that can only handle a low-resolution image. In this example, the server system can be configured to perform pre-processing on the video itself, for example, by combining multiple video sources into a single video feed, or by performing near-real-time transcription (or, in other words, closed captions) or translation.

A server system can decompress a share, which can help to enhance the quality of an experience-sharing session. In some implementations, a sharing device can compress a share before transmitting the share to a server system, in order to reduce transmission load on a connection between the sharing device and the server system. If the transmission load is less of a concern for the connection between the server system and a given viewing device, then the server system can decompress the share prior to transmitting the share to the viewing device. For example, if a sharing devices uses a lossy spatial compression algorithm to compress a share before transmitting the share to a server system, the server system can apply a super-resolution algorithm (an algorithm that estimates sub-pixel motion, increasing the perceived spatial resolution of an image) to decompress the share before transmitting the share to one or more viewing devices. In other implementations, a sharing device can use a lossless data compression algorithm to compress a share before transmission to a server system, and the server system can apply a corresponding lossless decompression algorithm to the share so that the share can be usable by a given viewing device.

Examples of Experience Sharing for Training

FIGS. 3A-3E illustrate an example of an experience-sharing scenario 300 for training. In particular, the experience-sharing scenario 300 shows an expert mechanic (or simply "expert") who is teaching a novice mechanic (or simply "novice") how to service an engine of a vehicle. The expert is wearing a HMD 302 and is working on a vehicle 304 at a first location 306. The novice is wearing a HMD 312 and is working on a vehicle 314 at a second location 316. Using the HMD 302, the expert can demonstrate to others, including the novice, how to service the engine of the vehicle 304 (or a vehicle that is similar to the vehicle 304) from the expert's point-of-view perspective. Using the HMD 312, the novice can learn how to service the engine of the vehicle 314 through the expert's point-of-view perspective.

The HMDs 302, 312 can be configured to communicate with each other (and with other computing devices) in various ways. In an implementation, the HMDs 302, 312 can communicate with each other over a network 318. The network 318 can be any suitable network or combination of networks. For example, the network 318 can be the network 132, discussed above in connection with FIG. 1. The first location 306 and the second location 316 can be near one another or, alternatively, can be remote to one another. For example, the expert can be located in one city and can teach students, including the novice, in another city how to service a vehicle engine. In another implementation, the HMDs 302, 312 can communicate with each other directly. In this implementation, the network 318 can represent a direct link between the HMD 302 and the HMD 312.

A server system 320 can facilitate an experience-sharing session between the HMDs 302, 312. During the experience-sharing session, one or both of the HMDs 302, 312 can transmit content to the server system 320 via the network 318, and can receive content from the server system 320 via the network 318. The content can include media content. For example, the expert's HMD 302 can record and transmit a video to the server system 320. The video can capture a point-of-view perspective of the expert. The server system 320 can then transmit the video to the novice's HMD 312. Further, the server system 320 can transmit content in real-time to one or both of the HMDs 302, 312, and to any other computing device. For example, the server system 320 can receive content from the novice's HMD 312 and transmit the content in real-time to the expert's HMD 302. Although the experience-sharing scenario 300 shows an experience-sharing scenario between two wearable devices, the experience-sharing session 300 can include any number of HMDs or other computing devices.

Figure 3A:
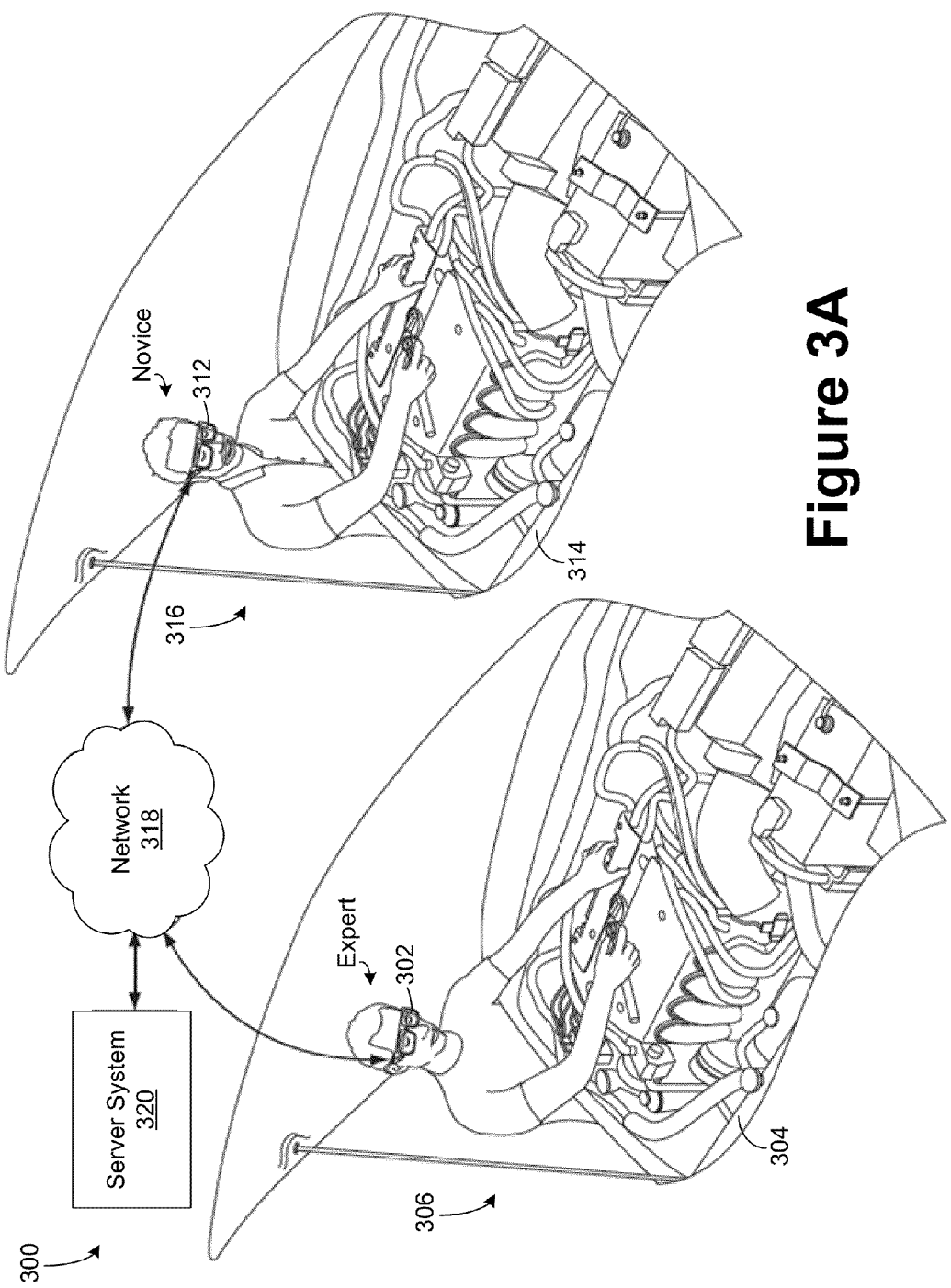
FIGS. 3A-3E illustrate an example of an experience-sharing scenario for training.
Figure 3B:
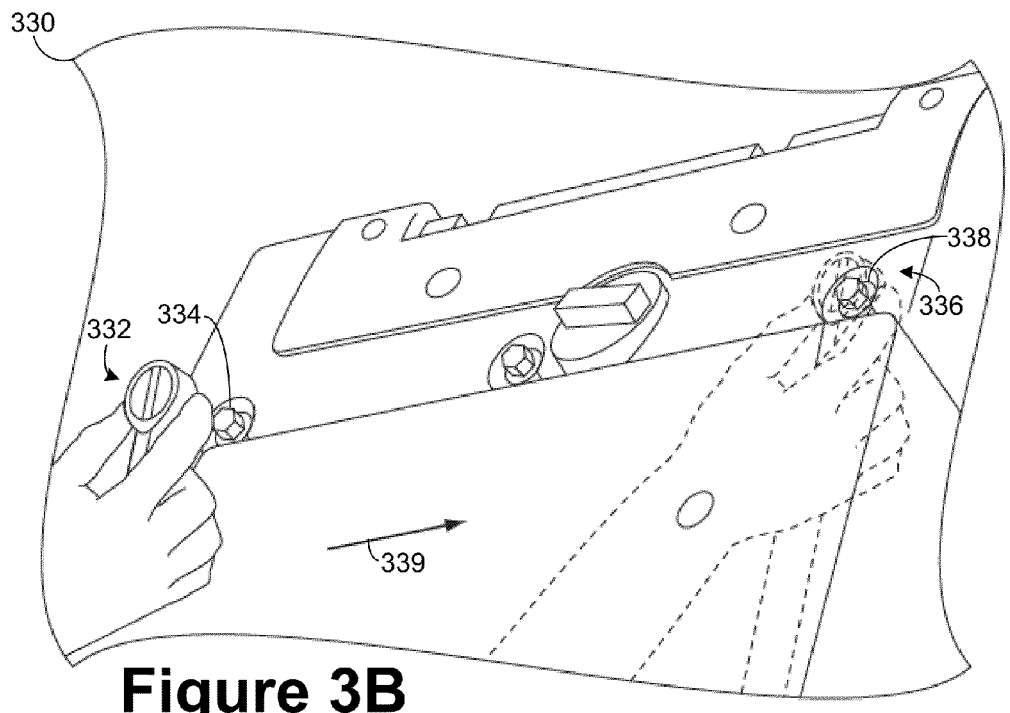

FIG. 3B shows an example of a point-of-view perspective 330 (or simply "perspective") as seen using a HMD. In some examples provided in this disclosure, the perspective 330 can be a perspective of the expert using the HMD 302. For example, during an experience-sharing session, assume that the expert can see the perspective 330 through the HMD 302. The expert's HMD 302 can generate media content indicative of the perspective 330 and transmit the media content to the novice's HMD 312. In some examples provided in this disclosure, the perspective 330 can be a perspective of the novice using the HMD 312. For example, during an experience-sharing session, assume that the novice can see the perspective 330 through the HMD 312. The novice's HMD 312 can generate media content indicative of the perspective 330 and transmit the media content to the expert's HMD 302.

As shown in FIG. 3B, the perspective 330 shows a hand holding a tool at a first position 332, where the tool is used to perform a task on a first fastener 334. After performing the task, the hand moves the tool to a second position 336, where the tool is used to perform a task on the second fastener 338.

For example, assume that the perspective 330 is that of the expert using the HMD 302. In this example, the expert can perform a first task on the first fastener 334 at the first position 332, and then perform a second task on the second fastener 338 at the second position 336. Meanwhile, the expert's HMD 302 can record a video showing the expert's hand and tool performing the first and second tasks. In this example, the expert's HMD 302 can transmit the video to the server system 320 via the network 318, and the server system 320 can then transmit the video to the novice's HMD 312 via the network 318. The video can be transmitted from the expert's HMD 302 to the novice's HMD 312 in real-time or outside real-time.

Although the previous example discusses transmitting a video, any media content can be transmitted. As discussed in the previous example, the media content can include one or more videos. Also, the media content can include one or more images. For example, the expert's HMD 302 can generate a first image of the expert's hand holding the tool near the first fastener 334 at the first location 332, and can generate a second image of the tool near the second fastener 338 at the second location 336. In addition, the media content can include audio. For example, the expert's HMD 302 can record the expert as the expert explains the steps involved in performing the first and second tasks. Further, the media content can include one or more annotations. For example, the expert's HMD 302 can generate an annotation 339 that shows that the tool is moving from the first position 332 to the second position 336. In a variation, the server system 320 or the novice's HMD 312 can generate the annotation 339. These examples are merely illustrative, and the media content can include any other type of media content.

Figure 3C:
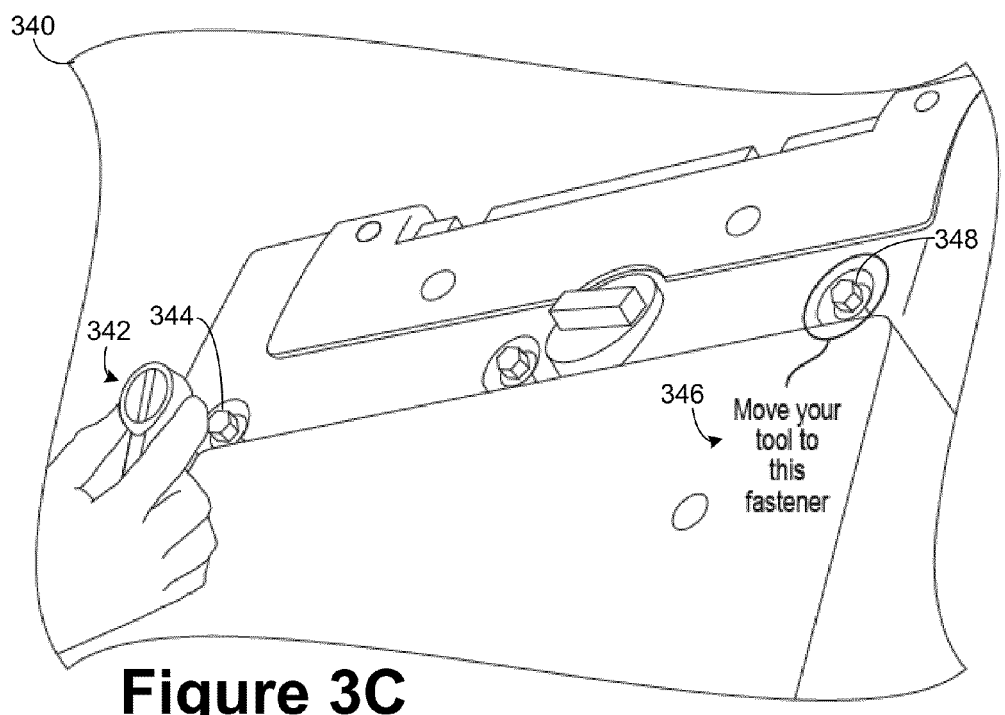

FIG. 3C shows an example of a point-of-view perspective 340 (or simply "perspective") as seen using the novice's HMD 312. During an experience-sharing session, the novice's HMD 312 can generate media content that is indicative of the perspective 340, and then transmit the media content to the expert's HMD 302. The media content can be transmitted in real-time or outside real-time.

As shown in FIG. 3C, the perspective 340 shows the novice's hand holding a tool at a first position 342, where the tool is used to perform a task on a first fastener 344. As mentioned above, the novice's HMD 312 can generate media content that is indicative of the perspective 340, and then transmit the media content in real-time. The novice's HMD 312 can also receive media content in real-time. For example, the novice's HMD 312 can transmit a video that is indicative of the perspective 340 in real-time to the expert's HMD 302. The expert's HMD 302 can present the video to the expert in real-time, and the expert can use the HMD 302 to transmit comments to the novice's HMD 312. For instance, after the expert's HMD 302 presents the video to the expert, the expert can provide a comment 346 instructing the novice to move the novice's tool to a fastener 348.

The expert can use the HMD 302 to provide comments in any suitable form. The expert's comments can be in the form of text, as shown in FIG. 3C. The text can be generated by the expert's HMD 302, the novice's HMD 312, or the server system 320. The expert's comments can be provided as audio. For example, the expert's HMD 302 can record the expert saying "Move your tool to this fastener," and can then transmit the audio to the novice's HMD 312. The novice's HMD 312 can then play the audio. The expert's comments can be provided as a video or as images. For example, the expert's HMD 302 can record a video of the expert moving the expert's tool from the first position 332 (shown in FIG. 3B) to the second position 336. The expert's HMD 302 can then transmit the video to the novice's HMD 312. The novice's HMD 312 can then present the video to the novice. The novice's HMD 312 can present the video by itself or as an overlay to the novice's view of the physical world. Accordingly, the novice's HMD 312 can show the novice not only his own hand performing the task, but also a simulation of the expert's hand performing the task.

The experience-sharing session can include phases. In some implementations, the experience-sharing session includes a demonstration phase followed by an observation phase. For instance, during the demonstration phase, the expert can use the HMD 302 to teach the novice how to perform a task. During the observation phase, the expert can use the HMD 302 to watch and provide real-time comments while the novice performs the task. As an example of a demonstration phrase, assume that the perspective 330 shown in FIG. 3B is that of the expert using the HMD 302. The expert's HMD 302 can generate a video showing the expert's hand and tool performing first and second tasks, and can transmit the video to the novice's HMD 312. The novice's HMD 312 can then present the media content to the novice. In this example, an observation phase can then begin. During the observation phase, the novice's HMD 312 can generate and transmit, in real-time, a video showing the novice's hand and tool fastening the first fastener 344 at the first position 342 (as shown in FIG. 3C). During the observation phase, the expert's HMD 302 can present the video in real-time to the expert. The expert can then use the HMD 302 to transmit comments, such as the comment 346, in real-time to the novice's HMD 312. Accordingly, the expert can instruct the novice how to perform a task, and can then watch the novice perform the task in real-time while providing feedback to improve the novice's ability to perform the task.

In some implementations, the observation phase and the demonstration phase overlap. As an example, the expert can perform a first task of fastening the first fastener 334 at the first position 332. The expert's HMD 302 can generate a video showing the expert's hand and tool performing the first task, and can then transmit the video in real-time to the novice's HMD 312. The novice's HMD 312 can then present the video in real-time to the novice. While looking at the HMD 312, the novice can see a real-time video of the expert's hand and tool performing the first task overlaid upon the novice's view of the physical world. Accordingly, the novice can move his own hand to follow the expert's hand in real-time in order to perform the first task. Likewise, during the experience-sharing session, the novice's HMD 312 can transmit a video, or any other media content, in-real time to the expert's HMD 302. Accordingly, while looking at the HMD 302, the expert can see not only his own hand performing a task, but also a real-time overlayed video showing the novice's hand performing the task. In this way, a demonstration phase and observation phase of an experience-sharing session can overlap, and the session's participants can teach or learn a given task simultaneously or near-simultaneously.

In an experience-sharing session, media content generated at a first sharing device can be presented to a second sharing device according to the second sharing device's perspective. For example, assume that the expert has finished demonstrating how to fasten the fasteners 334, 338, and that the expert's HMD 302 has sent a video that is indicative of the demonstration to the server system 320. In this example, the server system 320 can also receive information in real-time that is indicative of a perspective of the novice's HMD 312. For example, the information can include gyroscopic information that indicates how the novice's HMD 312 is oriented, location information that indicates where the novice's HMD 312 is located, gaze information that indicates a gaze direction of the novice's eye(s), or the like.

The server system 320 can use the received information to identify a portion of the media content that corresponds to the perspective of the novice's HMD 312. For example, the server system 320 can analyze a video recorded at the expert's HMD 302 to identify a portion of the video that has corresponding gyroscopic information to gyroscopic information received from the novice's HMD 312. The server system 320 can then transmit the identified portion of the video in real-time to the novice's HMD 312. The novice's HMD 312 can then present the identified portion of the video to the novice.

Figure 3D:
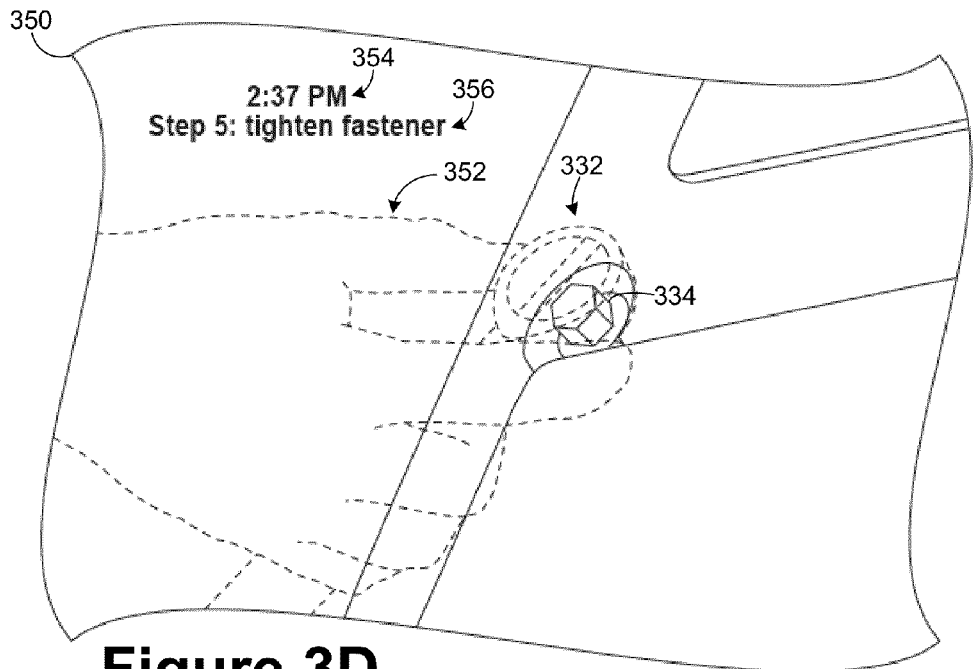

Accordingly, as the novice uses the HMD 312 to look at an object, the HMD 312 can present a video showing the expert's hand and tool performing a task on the object as an overlay of the novice's view of the physical object. FIG. 3D shows an example of the foregoing scenario. In particular, FIG. 3D shows an example of a point-of-view perspective 350 (or simply "perspective") as seen by the novice using the HMD 312. The perspective 350 is similar to the perspective shown in FIG. 3B. However, in the perspective 350, the novice is not performing a task and the novice's HMD 312 is more closely focused on the first fastener 334. As the novice uses the HMD 312 to look at the first fastener 334, the novice's HMD 312 can present a corresponding portion of media content that was generated at the expert's HMD 302. In particular, the novice's HMD 312 presents a portion of a video 352 (generally indicated by dashed lines) that shows the expert's hand using a tool to fasten the first fastener 334 located at the first position 332. The novice's HMD 312 also shows a time 354 and a step description 356 that are associated with the portion of the video. Accordingly, the novice can use the HMD 312 to look at an object and see a video that shows the expert's hand and tool performing a task on the object.

Figure 3E:
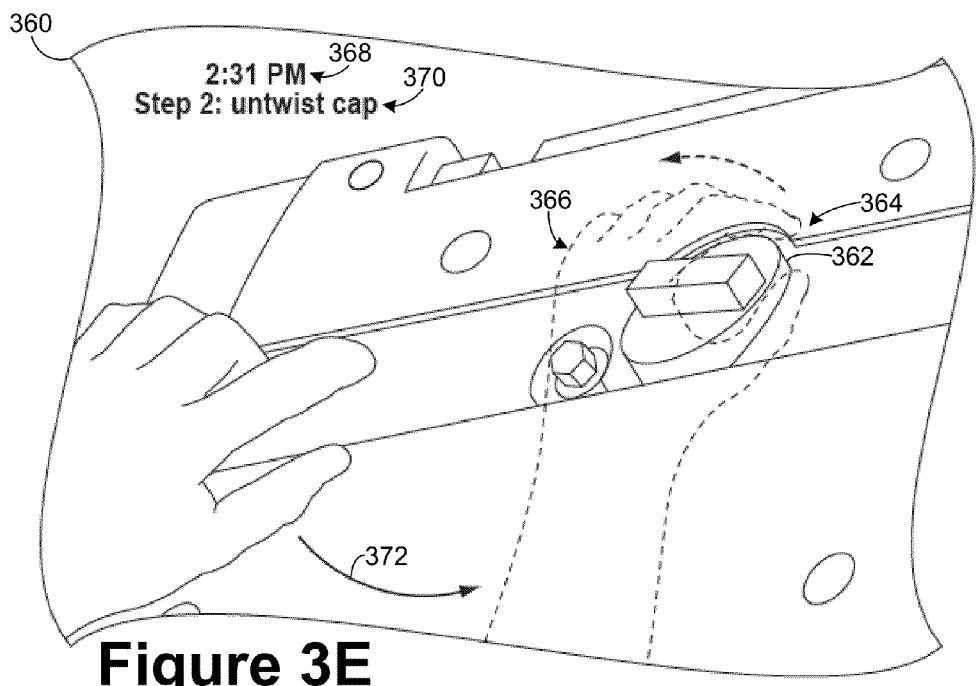

FIG. 3E shows another example of a point-of-view perspective 360 (or simply "perspective") as seen by the novice while wearing the HMD 312. The perspective 360 is similar to the perspective 350 shown in FIG. 3E, except that in the perspective 360 the novice's HMD 312 is now focused on a cap 362 located at a second position 364, rather than on the first fastener 334 located at the first position 332. In other words, the novice has either moved his head closer to the cap 362 or changed a zoom setting of the HMD 312 to focus more closely on the cap 362. As the novice uses the HMD 312 to look at the cap 362, the HMD 312 can present a corresponding portion of a video 366 that was generated at the expert's HMD 302. The video 366 shows the expert's hand tightening the cap 362. The novice's HMD 312 also shows a time 368 and a step description 370 that are associated with the portion of the video 366. The novice's HMD 312 further shows the novice's hand (generally indicted by a solid line), which is in the novice's view of the physical world, and shows an annotation 372 that indicates that the novice should move his hand to the illustrated position of the expert's hand.

Figure 4:
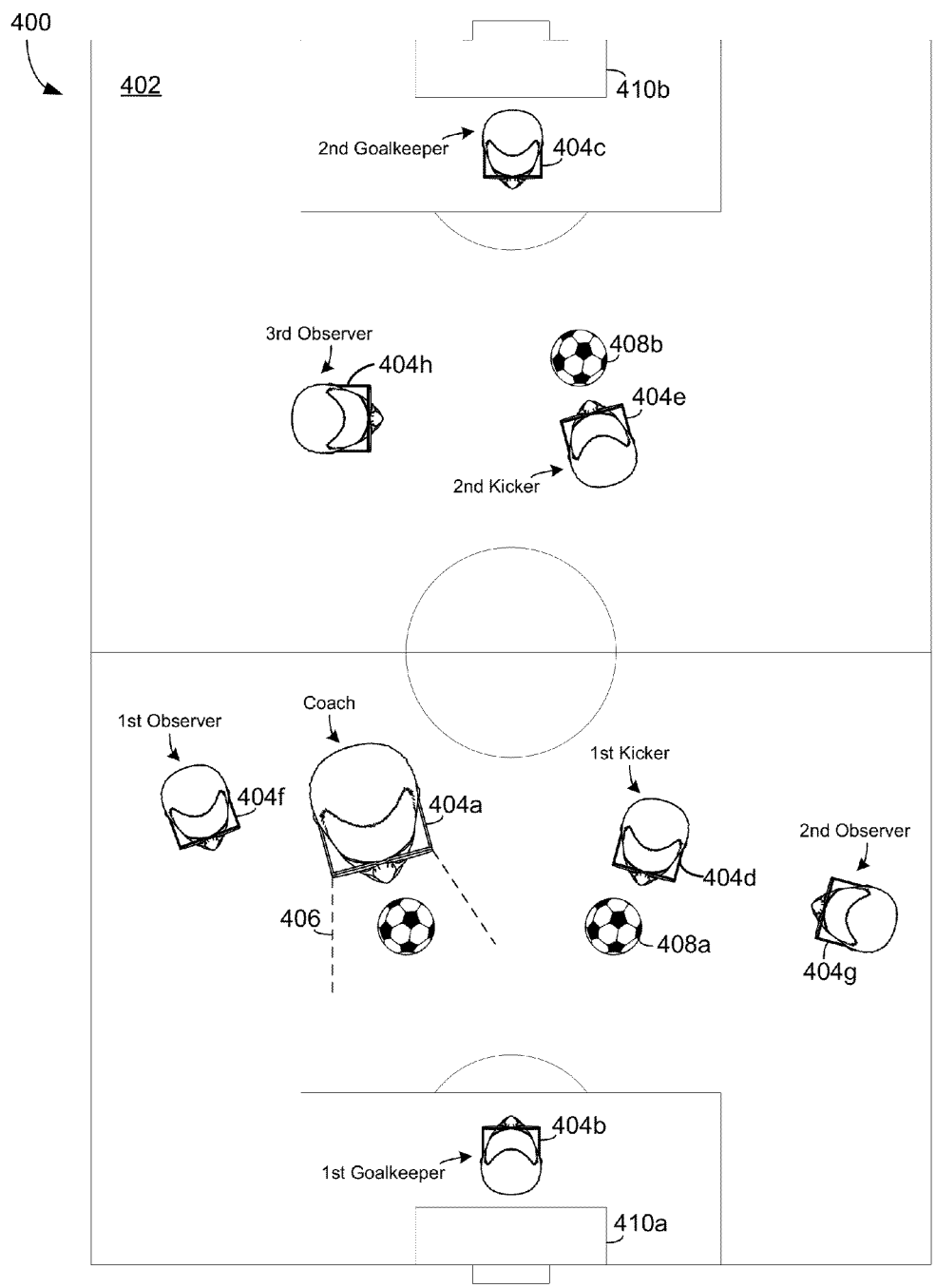
FIG. 4 illustrates another example of an experience-sharing scenario for training.

FIG. 4 illustrates another example of an experience-sharing scenario 400 for training. In particular, the experience-sharing scenario 400 shows a top view of a soccer field 402. On the soccer field 402 are a coach, two goalkeepers, two kickers, and three observers who are taking part in a soccer practice. The coach is wearing a HMD 404a, the goalkeepers are wearing HMDs 404b-c, the penalty kickers are wearing HMDs 404d-e, and the observers are wearing HMDs 404f-h.

The HMDs 404*a-h* are configured to engage in an experience-sharing session in the ways described above.

As shown in FIG. 4, the coach is facing the first goalkeeper. The coach's field of vision 406 encompasses the first goalkeeper, but does not encompass the second goalkeeper, the kickers, or the observers. Accordingly, without the coach's HMD 404*a*, the coach is unable to observe any players other than the first goalkeeper.

In an experience-sharing session, the coach, while wearing the HMD 404*a*, can observe and provide comments to the kickers or goalkeepers, whether or not they are located outside the coach's field of vision 406. For example, assume that the coach wants to observe the second kicker while the coach is facing the first goalkeeper. In this example, the third observer's HMD 404*h*, the second goalkeeper's HMD 404*c*, or both, can generate a video that shows the second kicker. The video(s) can then be transmitted to the coach's HMD 404*a*. The coach's HMD 404*a* can then present the video(s) to the coach.

In an experience-sharing session, multiple videos or other media contents can be generated for simultaneous presentation. For example, the second observer's HMD 404*g* can generate a first video that focuses on the first kicker, and the third observer's HMD 404*h* can generate a second video that focuses on the second kicker. The first and second videos can then be transmitted to the coach's HMD 404*a* via a server system (not shown in FIG. 4). The server system can process the first video, the second video, or both. For example, the server system can perform time scaling or time shifting on one or both of the videos to ensure that the videos have corresponding start times, end times, durations, or the like. As another example, the server system can perform operations of panning, zooming, rotating, or the like, on one or both of the videos to ensure that the contents of the videos properly align with one another. As yet another example, the server system can horizontally flip contents of one of the videos if, for example, the first kicker kicks with his left foot and the second kicker kicks with his right foot. As still another example, the server system can analyze videos to determine a feature that is common to both of the videos. For instance, the server system can analyze the first and second videos to identify the soccer ball, a kicking foot of the kicker, or the like. The server system can then provide an annotation of the common feature. Accordingly, when the videos are presented to a viewer, the annotation can overlay the videos so that the viewer can easily see the common feature.

After receiving the first and second videos, the coach's HMD 404*a* can present the received videos to the coach simultaneously. For example, assume that the coach's HMD 404*a* has two lenses. In this example, the HMD 404*a* can present the first video at one lens and the second video at the other lens. As another example, the coach's HMD 404*a* can overlay the first video on the second video, or vice-versa. Accordingly, the coach can determine a feature of the first kicker relative to the feature of the second kicker. For instance, the coach can determine a position of the first kicker's kicking foot relative to a position of the second kicker's kicking foot. As mentioned above, the server system can overlay annotations of a common feature (for example, a kicking foot) on the presented videos. If the server system does so, then the coach can simply look for the annotations to determine where the first kicker's kicking foot is located relative to the second kicker's kicking foot at a given time.

Multiple videos or other media contents can be ranked. For example, assume that the first kicker's HMD 404*d* generates a first video showing the first kicker kicking a first soccer ball 408*a* at a first goal 410*a*, and scoring a goal. In this example, also assume that the second kicker's HMD 404*e* generates a second video showing the second kicker kicking a second soccer ball 408*b* at a second goal 410*b*, and missing the goal. The server system can analyze one or both of the videos to rank them. In an implementation, the server system can identify a feature and a target threshold in each of the videos. For example, the server system can analyze the first video to identify a feature such as a position or motion of the soccer ball 408*a*, and to identify a threshold such as a perimeter of the goal 410*a*. The server system can similarly analyze the second video. The server system can then compare the feature to the threshold in each of the videos to determine that the first kicker scored a goal and that the second kicker did not score a goal. Accordingly, the server system can rank the first video higher than the second video.

The server system can transmit ranked videos in various ways. In a variation, the server system can transmit all of the ranked videos in a ranked order. For example, the server system can transmit the videos in an order of descending ranking to the coach's HMD 404*a*. In another variation, the server system can transmit a predetermined number of the highest ranked videos. For example, the server system can transmit the three highest-ranked videos to the coach's HMD 404*a*. In another variation, the server system can transmit a predetermined number of the lowest ranked videos. For example, the server system can transmit the three-lowest ranked videos to the coach's HMD 404*a*. In another variation, the server system can transmit only those videos that meet a condition. For example, the server system can transmit only those videos to the coach's HMD 404*a* that show a player missing a shot. As another example, the server system can transmit only the first kicker's HMD's videos in which the soccer ball 408*a* missed the goal 410*a* by at least six feet. Accordingly, the coach can observe the first kicker's shots that completely missed the goal 410*a* so that the coach can reprimand the first kicker or, alternatively, provide suitable coaching to the first kicker. These variations and examples are illustrative, and the server system can transmit ranked videos in various other ways.

Examples of Training Methods

Figure 5:
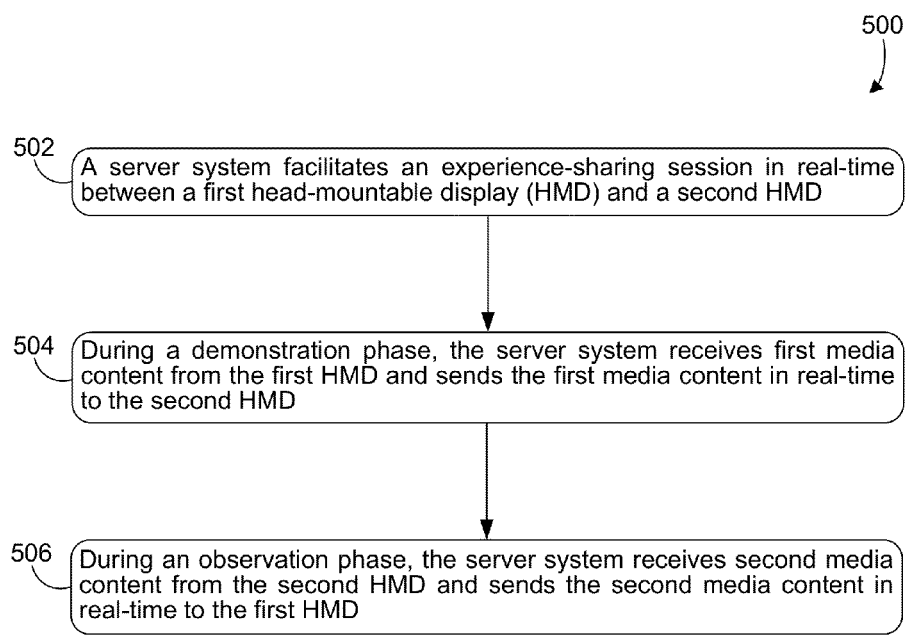
FIG. 5 illustrates an example of an experience-sharing method for training.

FIG. 5 shows an example of an experience-sharing method 500 for training. The method 500 can be performed, for example, in connection with the server system 122 shown in FIG. 1 or can be performed in connection with a different system or device. At block 502, a server system can facilitate an experience-sharing session in real-time between a first head-mountable display (HMD) and a second HMD. The experience-sharing session can include a demonstration phase and an observation phase.

At block 504, during the demonstration phase, the server system can receive first media content from the first HMD and send the first media content in real-time to the second HMD. The first media content can include a point-of-view video recorded at the first HMD.

At block 506, during the observation phase, the server system can receive second media content from the second HMD and send the second media content in real-time to the first HMD. The second media content can include a point-of-view video recorded at the second HMD.

In a variation, during the demonstration phrase, the server system can receive information indicative of a perspective of the second HMD. The information can be generated based on one or more sensors of the second HMD. The server system can identify a portion of the first media content that corresponds to the perspective. The server system can send the portion in real-time to the second HMD.

In a variation, during the observation phase, the server system can receive information indicative of one or more sensors of the second HMD. The server system can send the information in real-time to the first HMD. For example, the information can include an orientation of the second HMD. As another example, the information can include a location of the second HMD.

In a variation, during the observation phase, the server system can receive a comment corresponding to the point-of-view video recorded at the second HMD. The server system can send the comment in real-time to the second HMD.

In a variation, the server system can determine a target threshold based on the first media content. During the observation phase, the server system can compare the second media content with the target threshold in real-time. In a further variation, during the observation phase, the server system can generate an indicator in response to the second media content exceeding the target threshold. The server system can send the indicator in real-time to at least one of the first HMD and the second HMD.

In a variation, during the observation phase, the server system can process multiple point-of-view videos, including the second point-of-view video, recorded at multiple corresponding HMDs, including the second HMD, to identify a feature that is common to the multiple point-of-view videos. The server system can send information indicative of the feature to the first HMD in real-time.

In a variation, the server system can determine a target threshold based on the first point-of-view video. During the observation phase, the server system can receive multiple point-of-view videos, including the second point-of-view video, recorded at multiple corresponding HMDs, including the second HMD. During the observation phase, the server system can determine a ranking of the multiple point-of-view videos based on the target threshold. In a first further variation, the server can send a predetermined number of highest-ranking videos to the first HMD. In a second further variation, the server system can send a predetermined number of lowest-ranking videos to the first HMD.

In a variation, the first media content and the second media content can correspond to a same activity. For example, in connection with FIGS. 3A-3E, the first and second media contents can correspond to the activity of repairing an engine of a vehicle. As another example, in connection with FIG. 4, the first and second media contents can correspond to the activity of playing soccer. These examples are merely illustrative.

In a variation, the demonstration phase overlaps the observation phase.

In a variation, the demonstration phase and the observation phase occur simultaneously.

Figure 6:
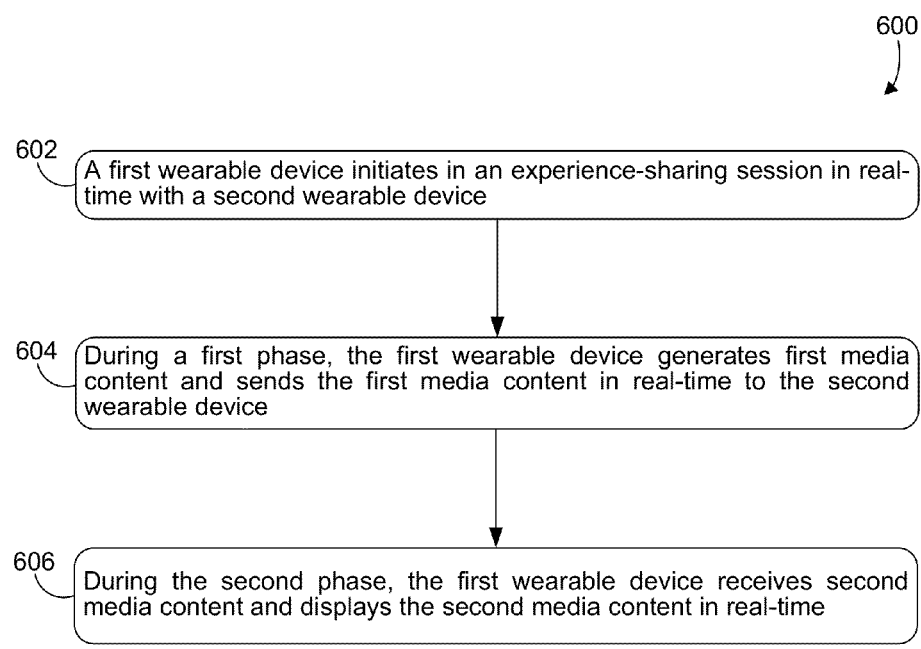
FIG. 6 illustrates another example of an experience-sharing method for training.

FIG. 6 shows an example of an experience-sharing method 600 for training. The method 600 can be performed, for example, in connection with the wearable computing device 100 (shown in FIG. 1), the wearable computing device 200 (shown in FIGS. 2A-2B), the wearable computing device 250 (shown in FIG. 2C), the wearable computing device 270 (shown in FIG. 2D), or another wearable device. At block 602, a first wearable device initiates in an experience-sharing session in real-time with a second wearable device. The experience-sharing session can include a first phase and a second phase.

At block 604, during the first phase, the first wearable device can generate first media content and send the first media content in real-time to the second wearable device. The first media content can include a point-of-view video recorded at the first wearable device.

At block 606, during the second phase, the first wearable device can receive second media content and display the second media content in real-time. The second media content can include a point-of-view video recorded at the second wearable device.

In a variation, the first media content is sent directly to the second wearable device. In a variation, the first media content is sent to the second wearable device via a server system.

CONCLUSION

With respect to any or all of the ladder diagrams, scenarios, and flow charts in the figures and as discussed herein, each block and/or communication can represent a processing of information and/or a transmission of information in accordance with disclosed examples. More or fewer blocks and/or functions can be used with any of the disclosed ladder diagrams, scenarios, and flow charts, and these ladder diagrams, scenarios, and flow charts can be combined with one another, in part or in whole.

A block that represents a processing of information can correspond to circuitry that can be configured to perform the specific logical functions of a herein-described method or technique. Alternatively or additionally, a block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk or hard drive or other storage medium.

The computer readable medium can also include non-transitory computer readable media such as computer-readable media that stores data for short periods of time like register memory, processor cache, and random access memory (RAM). The computer readable media can also include non-transitory computer readable media that stores program code and/or data for longer periods of time, such as secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a block that represents one or more information transmissions can correspond to information transmissions between software and/or hardware modules in the same physical device. However, other information transmissions can be between software modules and/or hardware modules in different physical devices.

It should be understood that for situations in which the disclosed examples collect or use any personal information about users or information that might relate to personal information of users, the users can be provided with an opportunity to opt in/out of programs or features that involve such personal information (for example, information about a user's preferences or a user's contributions to social content providers). In addition, certain data can be anonymized in one or more ways before it is stored or used, so that personally identifiable information is removed. For example, a user's identity can be anonymized so that no personally identifiable information can be determined for the user and so that any identified user preferences or user interactions are generalized (for example, generalized based on user demographics) rather than associated with a particular user.

While various examples have been disclosed, other examples will be apparent to those skilled in the art. The various disclosed examples are for purposes of illustration and are not intended to be limiting, with the true scope and spirit being indicated by the following claims.

What is claimed is:

1. A computer-implemented method comprising:
    a server system facilitating an experience-sharing session in real-time between a first head-mountable display (HMD) and two or more second HMDs, wherein the experience-sharing session includes a demonstration phase and an observation phase;
    during the demonstration phase, the server system receiving first media content from the first HMD and sending the first media content in real-time to at least one of the second HMDs, wherein the first media content includes first point-of-view video recorded at the first HMD, wherein the first point-of-view video comprises a first performance of one or more tasks;
    determining a desired characteristic of the one or more tasks; and
    during the observation phase:
        receiving, by the server system, multiple point-of-view videos that were recorded at multiple corresponding HMDs, wherein receiving the multiple point-of-view videos comprises the server system receiving second media content from each of two or more of the second HMDs, wherein the second media content received from each second HMD includes second point-of-view video recorded at the second HMD, wherein the second point-of-view video comprises a second performance of the one or more tasks, and wherein the first performance is different from the second performance;
        determining a ranking of the multiple point-of-view videos based on the desired characteristic; and
        sending the second media content received from at least one second HMD to the first HMD in real-time.

2. The method of claim 1, further comprising, during the demonstration phase, the server system:
    receiving information indicative of a perspective of a given one the second HMDs, wherein the information is generated based on one or more sensors of the given second HMD;
    identifying a portion of the first media content that corresponds to the perspective; and
    sending the portion in real-time to the given second HMD.

3. The method of claim 1, further comprising, during the observation phase, the server system:
    receiving information based on data captured at one or more sensors a given one of the second HMDs; and
    sending the information in real-time to the first HMD.

4. The method of claim 1, further comprising, during the observation phase, the server system:
    receiving a comment corresponding to the second point-of-view video recorded at a given one of the second HMDs; and
    sending the comment in real-time to the given second HMD.

5. The method of claim 1, further comprising the server system:
    determining the desired characteristic of the one or more tasks based on the first performance of the one or more tasks; and
    during the observation phase, comparing a corresponding characteristic of each second performance of the one or more tasks with the desired characteristic in real-time.

6. The method of claim 5, further comprising, during the observation phase, the server system:
    generating an indicator in response to the comparison of the desired characteristic of the one or more tasks to the corresponding characteristic of a given one of the second performances of the one or more tasks; and
    sending the indicator in real-time to at least one of the first HMD and the corresponding second HMD.

7. The method of claim 1, further comprising, during the observation phase, the server system:
    processing the multiple point-of-view videos that were recorded at the multiple corresponding HMDs to identify a feature that is common to the multiple point-of-view videos; and
    sending information indicative of the feature to the first HMD in real-time.

8. The method of claim 1, further comprising sending a predetermined number of highest-ranking videos to the first HMD.

9. The method of claim 1, further comprising sending a predetermined number of lowest-ranking videos to the first HMD.

10. The method of claim 1, wherein the first media content and the second media content correspond to a same activity.

11. The method of claim 1, wherein the demonstration phase overlaps the observation phase.

12. The method of claim 1, wherein the demonstration phase and the observation phase occur simultaneously.

13. A system comprising:
    a non-transitory computer-readable medium; and
    program instructions stored on the non-transitory computer-readable medium and executable by at least one processor to:
        facilitate an experience-sharing session in real-time between a first head-mountable display (HMD) and two or more second HMDs, wherein the experience-sharing session includes a demonstration phase and an observation phase;
        during the demonstration phase, receive first media content from the first HMD and send the first media content in real-time to at least one of the second HMDs, wherein the first media content includes first point-of-view video recorded at the first HMD, wherein the first point-of-view video comprises a first performance of one or more tasks;
        determine a desired characteristic of the one or more tasks; and
        during the observation phase:
            receive multiple point-of-view videos that were recorded at multiple corresponding HMDs, wherein receiving the multiple point-of-view videos comprises receipt of second media content from each of two or more of the second HMDs, wherein the second media content received from a given second HMD includes second point-of-view video recorded at the second HMD, wherein the second point-of-view video comprises a second performance of the one or more tasks, and wherein the first performance is different from the second performance;
            determine a ranking of the multiple point-of-view videos based on the desired characteristic; and
            send the second media content received from at least one second HMD to the first HMD in real-time.

14. A computer-implemented method comprising:
- a first wearable device initiating in an experience-sharing session in real-time with two or more second wearable devices, wherein the experience-sharing session includes a first phase and a second phase;
- during the first phase, the first wearable device generating first media content and sending the first media content in real-time to two or more of the second wearable devices, wherein the first media content includes first point-of-view video recorded at the first wearable device, wherein the first point-of-view video comprises a first performance of one or more tasks;
- determining a desired characteristic of the one or more tasks; and
- during the second phase:
  - receiving, by the first wearable device, multiple point-of-view videos that were recorded at multiple second wearable devices, wherein receiving the multiple point-of-view videos comprises the first wearable device receiving second media content from each of two or more of the second wearable devices, wherein the second media content received from each of the two or more of the second wearable devices includes second point-of-view video recorded at the second wearable device, wherein the second point-of-view video comprises a second performance of the one or more tasks, and wherein the first performance is different from the second performance;
  - determining a ranking of the multiple point-of-view videos based on the desired characteristic; and
  - displaying, in real-time, the second media content received from at least one second wearable device to the first wearable device.

15. The method of claim 14, wherein sending the first media content in real-time to the second wearable device comprises sending the first media content directly to the second wearable device.

16. The method of claim 14, wherein sending the first media content in real-time to the second wearable device comprises sending the first media content to the second wearable device via a server system.

17. A wearable-device system comprising:
- a non-transitory computer-readable medium; and
- program instructions stored on the non-transitory computer-readable medium and executable by at least one processor to:
  - cause a first wearable device to initiate in an experience-sharing session with two or more second wearable devices, wherein the experience-sharing session includes a first phase and a second phase;
  - during the first phase, generate first media content and send the first media content in real-time to two or more of the second wearable devices, wherein the first media content includes first point-of-view video recorded at the first wearable device, wherein the first point-of-view video comprises a first performance of one or more tasks;
  - determine a desired characteristic of the one or more tasks; and
  - during the second phase:
    - receive multiple point-of-view videos that were recorded at multiple second wearable devices, wherein receipt of the multiple point-of-view videos comprises receipt of second media content from each of two or more of the second wearable devices, wherein the second media content received from each of the two or more of the second wearable devices includes second point-of-view video recorded at the second wearable device, wherein the second point-of-view video comprises a second performance of the one or more tasks, and wherein the first performance is different from the second performance;
    - determine a ranking of the multiple point-of-view videos based on the desired characteristic; and
    - display, in real-time, the second media content received from at least one second wearable device to the first wearable device.

18. The wearable-device system of claim 17, wherein at least one of the first wearable device and the second wearable device includes a head-mountable display.

19. The wearable-device system of claim 17, wherein the wearable-device system is disposed at the first wearable device or the second wearable device.

* * * * *